(12) United States Patent
Lai

(10) Patent No.: US 8,780,028 B2
(45) Date of Patent: Jul. 15, 2014

(54) ELECTRONIC DEVICE WITH CAPACITIVE TOUCH-SENSITIVE DISPLAY

(75) Inventor: Jackson Chi Sun Lai, Mississauga (CA)

(73) Assignee: BlackBerry Limited, Waterloo (CA)

( * ) Notice: Subject to any disclaimer, the term of this patent is extended or adjusted under 35 U.S.C. 154(b) by 163 days.

(21) Appl. No.: 13/360,244

(22) Filed: Jan. 27, 2012

(65) Prior Publication Data
US 2013/0194196 A1    Aug. 1, 2013

(51) Int. Cl.
*G09G 3/30* (2006.01)

(52) U.S. Cl.
USPC .............. 345/87; 345/92; 345/173; 345/174; 349/12; 349/110; 349/111

(58) Field of Classification Search
None
See application file for complete search history.

(56) References Cited

U.S. PATENT DOCUMENTS

| | | | |
|---|---|---|---|
| 4,857,907 A | 8/1989 | Koden | |
| 6,466,281 B1 | 10/2002 | Huang et al. | |
| 6,473,140 B1 | 10/2002 | Mizobata et al. | |
| 7,576,731 B2 * | 8/2009 | Okazaki | 345/173 |
| 2003/0222857 A1 | 12/2003 | Abileah | |
| 2004/0141096 A1 | 7/2004 | Mai | |
| 2007/0030221 A1 | 2/2007 | Pak et al. | |
| 2008/0062140 A1 * | 3/2008 | Hotelling et al. | 345/173 |
| 2008/0246905 A1 | 10/2008 | Chen et al. | |
| 2009/0322702 A1 | 12/2009 | Chien et al. | |
| 2010/0149117 A1 * | 6/2010 | Chien et al. | 345/173 |
| 2010/0289770 A1 * | 11/2010 | Lee et al. | 345/174 |
| 2011/0175846 A1 | 7/2011 | Wang et al. | |
| 2011/0279763 A1 | 11/2011 | Cho et al. | |
| 2011/0304571 A1 | 12/2011 | Kim et al. | |

FOREIGN PATENT DOCUMENTS

| | | |
|---|---|---|
| EP | 1422601 A1 | 5/2004 |
| EP | 2027524 | 12/2007 |
| EP | 2027524 A2 | 2/2009 |
| EP | 2333642 A1 | 6/2011 |

OTHER PUBLICATIONS

"Latest Materials for Displays" (Nakagawa) DOW Electronic Materials, Technical Marketing, Feb. 24, 2011.

International Search Report and Written Opinion of the International Searching Authority issued Apr. 4, 2013, in respect of corresponding International Patent Application No. PCT/CA2013/050054.

Extended European Search Report dated Jun. 25, 2012, issued against corresponding European Patent Application No. 12152959.8.

* cited by examiner

*Primary Examiner* — Joseph Haley
(74) *Attorney, Agent, or Firm* — Geoffrey deKleine; Borden Ladner Gervais LLP

(57) ABSTRACT

An assembly includes a substrate, scanning electrodes and sense electrodes disposed on the substrate, and color filter and black matrix disposed in an arrangement on the scanning electrodes and sense electrodes. The scanning electrodes and sense electrodes are disposed between the substrate and the arrangement.

13 Claims, 4 Drawing Sheets

ELECTRONIC DEVICE WITH CAPACITIVE TOUCH-SENSITIVE DISPLAY

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

DETAILED DESCRIPTION

Figure 1:
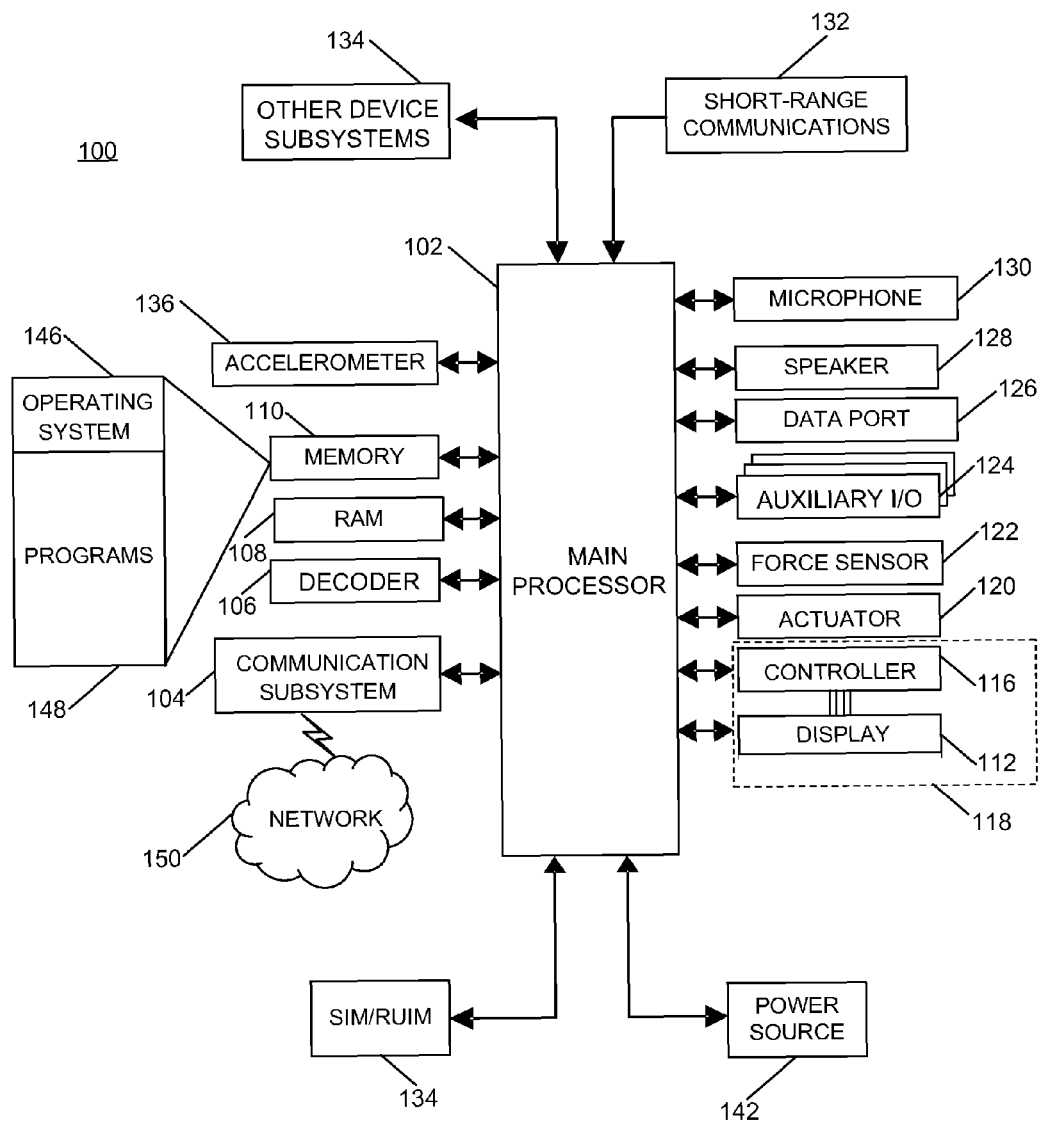
FIG. 1 is a block diagram of a portable electronic device in accordance with the disclosure.

The following describes an assembly that includes a color filter, a touch-sensitive display, and an electronic device that includes the touch-sensitive display. The assembly includes a substrate, scanning electrodes and sense electrodes disposed on the substrate, and a color filter and black matrix disposed in an arrangement on the scanning electrodes and sense electrodes. The scanning electrodes and sense electrodes are disposed between the substrate and the arrangement.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, which is a portable electronic device in the embodiments described herein. Examples of portable electronic devices include mobile, or handheld, wireless communication devices such as pagers, cellular phones, smartphones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a touch-sensitive display 118, an auxiliary input/output (I/O) subsystem 124, a data port 126, a speaker 128, a microphone 130, short-range communications 132, and other device subsystems 134. Input via a graphical user interface is provided via the touch-sensitive display 118. The touch-sensitive display 118 includes a display 112 and at least one electronic controller 116 that is utilized to interact with the processor 102. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

One or more touches, also known as touch contacts or touch events, may be detected by the touch-sensitive display 118. The processor 102 may determine attributes of the touch, including a location of a touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A signal is provided to the controller 116 in response to detection of a touch. A touch may be detected from any suitable input member, such as a finger, thumb, appendage, or other object, for example, a stylus, pen, or other pointer. Multiple simultaneous touches may be detected.

Figure 2:
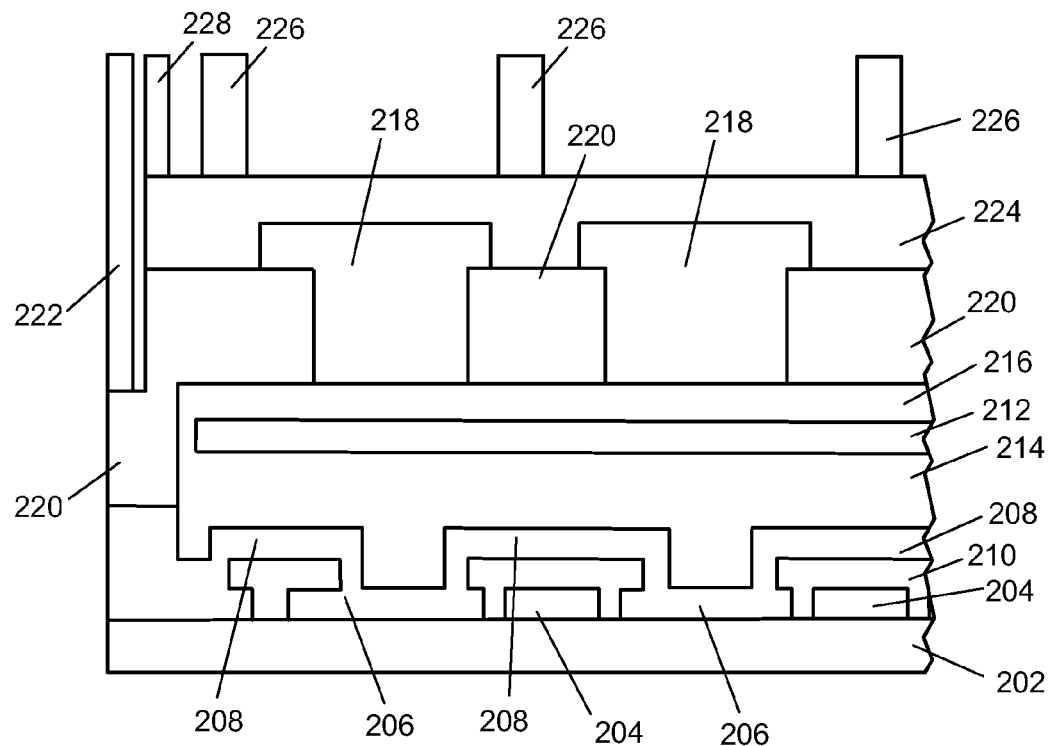
FIG. 2 is a partial cross section of an example of a color filter in accordance with the disclosure.

The touch-sensitive display 118 includes a thin film transistor (TFT) structure and a color filter. A partial cross section of one example is shown in FIG. 2. An In-Plane Switching (IPS) TFT structure may be utilized in the display 112 of the touch-sensitive display 118. A substrate 202 may be, for example, a glass substrate. Electrodes, including scanning electrodes 204 and sense electrodes 206, are disposed on the substrate 202. The scanning electrodes 204, also known as drive electrodes, and the sense electrodes 206, also known as receiving electrodes, are utilized for mutual capacitive touch sensing. The scanning electrodes 204 and the sense electrodes 206 are deposited on the substrate 202, for example, by depositing a conductive material such as indium tin oxide (ITO) followed by laser patterning. The scanning electrodes 204 and the sense electrodes 206 are disposed in a plane directly on the substrate 202. Other configurations of the scanning electrodes 204 and sense electrodes 206 are possible.

Electrical conductors 208, also known as bridges or jumpers, couple sense electrodes 206 at locations where the sense electrodes 206 cross over the scanning electrodes 204. An insulator 210 is disposed on the substrate 202, on and between the scanning electrodes 204 and the sense electrodes 206. The electrical conductors 208 may be deposited by a deposition process, after depositing and patterning the scanning electrodes 204 and the sense electrodes 206, and after depositing the insulator 210.

A shield 212 is disposed on an insulator on the scanning electrodes 204 and the sense electrodes 206, and the shield 212 is separated from the scanning electrodes 204, the sense electrodes 206, and the electrical conductors 208 by the insulator 214. The shield 212 may be any suitable material, such as ITO and is utilized to electrically shield the scanning electrodes 204 and sense electrodes 206 from the TFT structure. The shield 212 also shields the TFT structure from external electric fields, for example, from the environment, from electrical connections, or from other sources.

A color filter 218 and black matrix 220 are disposed on an insulator 216 on the shield 212. Examples of suitable materials for the insulators 210, 214, 216 include silicon oxide, silicon nitride, and so forth. The insulators 210, 214, 216 may be plasma enhanced chemical vapor deposited or sputter coated. The RGB (red-green-blue) elements 218 of the color filter are separated by black matrix 220. The black matrix 220 may also be disposed on the insulator 216 where the color filter 218 is not disposed. The black matrix 220 is a conductive material such as chromium. Edges of the black matrix 220 extend to contact the scanning electrodes 204 and the sense electrodes 206. The black matrix 220 electrically couples the scanning electrodes 204 to bond pads of the TFT structure, for example, via shorting bars 222 that extend between the edges of the black matrix 220 and the bond pads. The shorting bars 222 may be, for example, silver or other metallic material. The black matrix 220 also electrically couples the sense electrodes 206 to other bond pads of the TFT structure, for example, via silver shorting bars 222.

The color filter 218 and the black matrix 220 are covered by an overcoat 224 comprising, for example, polyimide. Spacers 226 and a seal 228 extend outwardly from the overcoat 224.

Figure 3:
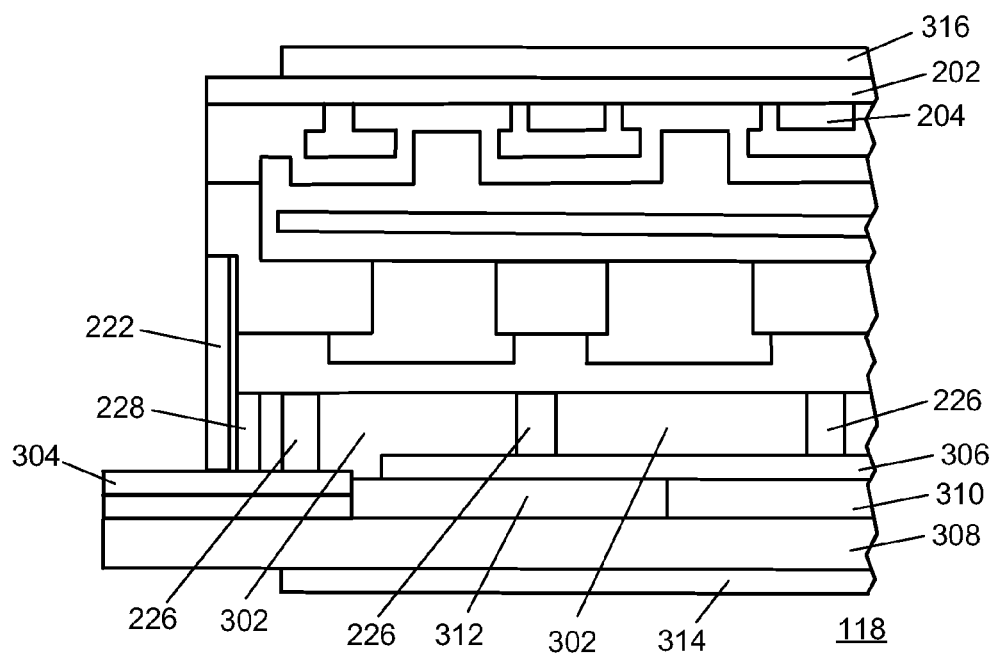
FIG. 3 is a partial cross section of one example of a touch-sensitive display in accordance with the disclosure.

A partial cross section of one example of a touch-sensitive display is illustrated in FIG. 3. The elements of FIG. 2 are disposed, vertically inverted from the perspective of the drawing, on the TFT structure such that the spacers 226 are disposed on the TFT structure. The seal 228 extends around the periphery of the TFT structure to seal the liquid crystal 302 within the display 112.

A single flex connector may be utilized to couple the scanning electrodes 204 and the sense electrodes 206 to the controller 116 and to couple pixel electrodes 306 to a separate controller, referred to as a display controller or display driver. The flex connector (not shown) is coupled to the bond pads 304 that are in contact with the silver shorting bars 222, and the silver shorting bars 222 couple to the scanning electrodes and sense electrodes. The pixel electrodes 306 are disposed on an insulator 310 and TFTs 312, which are disposed on a substrate 308 comprising glass, for example. The display controller may be coupled to the controller 116 to facilitate communication and to control and coordinate driving of the pixel electrodes 206 and the scanning electrodes 204. A first polarizer 314, also referred to as a bottom polarizer, is disposed on an underside of the substrate 308 and a second polarizer 316, also referred to as a top polarizer, is disposed on the substrate 202 such that the polarizer 314 and the polarizer 316 are the outer elements of FIG. 3. Although in this example the polarizers 314, 316 are the outermost elements, the polarizers need not be the outermost elements.

The scanning electrodes 204 are driven with a drive signal controlled by the controller 116. The sense electrodes 206 are utilized to measure the changes in electric field caused by an input member, such as a finger touching the touch-sensitive display 118. The scanning electrodes 204 are driven and the sense electrodes 206 are utilized for sensing during horizontal blanking times. The horizontal blanking times are, for example, periods during which source/drain electrodes are not driven, which source/drain electrodes couple the pixel electrodes 306 to the display controller. The scanning electrodes 204 are driven and the sense electrodes 206 are utilized for sensing during the horizontal blanking time to reduce coupling and interference with touch sensing and to increase the signal-to-noise ratio during touch sensing.

Figure 4:
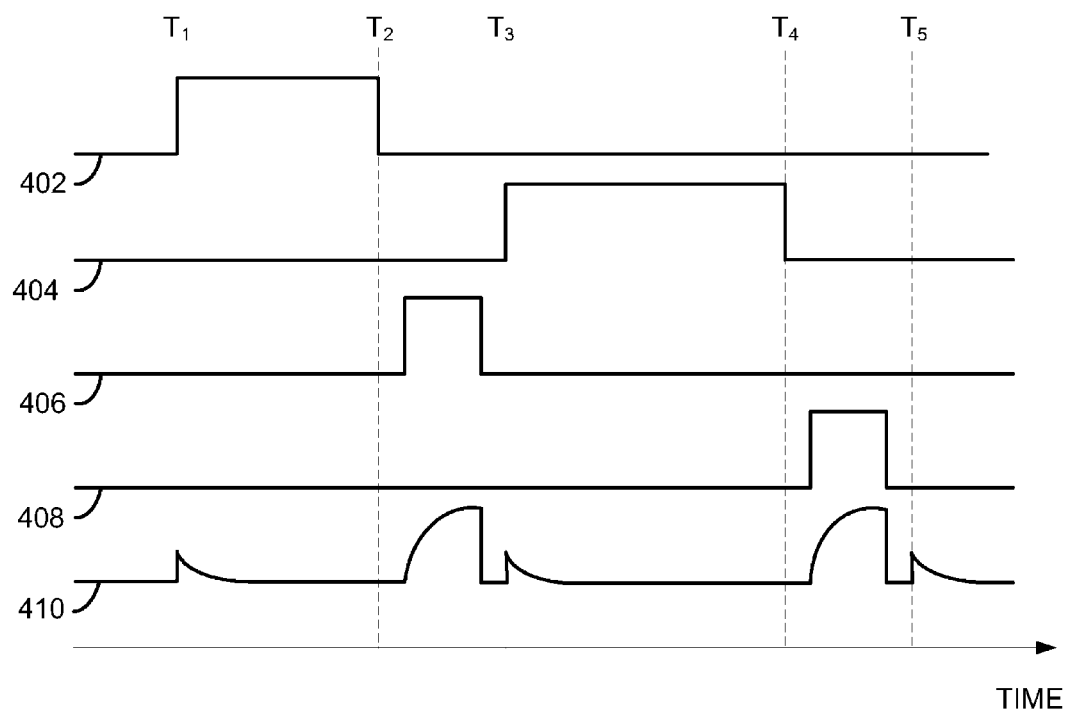
FIG. 4 is a diagram illustrating timing of driving scanning electrodes of the touch-sensitive display in accordance with the disclosure.

An example of timing of driving the pixel electrodes 306 and driving the scanning electrodes 204 is illustrated in FIG. 4. One source/drain electrode 402 that couples to one of the pixel electrodes 306 is driven between time T1 and time T2 and another source/drain electrode 404 is driven between time T3 and time T4. The time between time T2 and time T3 and the time between time T4 and time T5 are times during which source/drain electrodes are not driven. A scanning electrode 406 of the scanning electrodes 204 is driven and one sense electrode 410 of the sense electrodes 206 is utilized for sensing during the horizontal blanking time between time T2 and time T3. Another scanning electrode 408 of the scanning electrodes 204 is driven and the sense electrode 410 is utilized for sensing during the horizontal blanking time between time T4 and time T5.

Optionally, the scanning electrodes 204, the sense electrodes 206, and the pixel electrodes 306 may be coupled to the same controller, rather than utilizing two separate controllers. The scanning electrodes 204 and the sense electrodes 206 are coupled to the controller to control drive signals from the controller to the scanning electrodes 204 and to receive signals from the sense electrodes 206 during touch sensing. The pixel electrodes 306 may also be coupled to the controller to control the pixel electrodes 306 such that the controller is utilized to control both the display of information and touch sensing.

Figure 5:
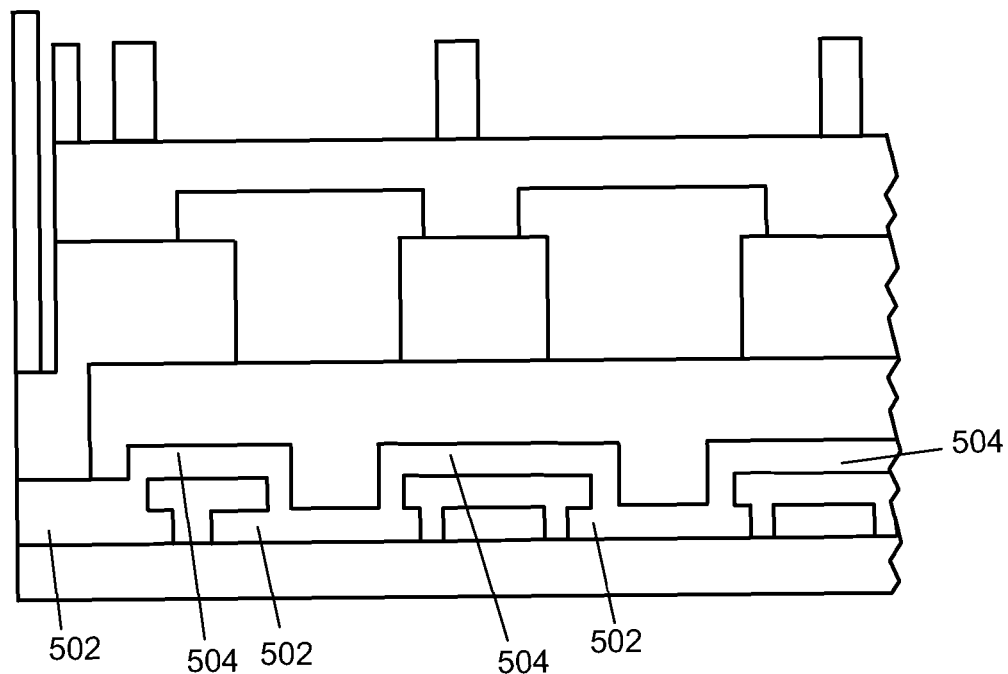
FIG. 5 is a partial cross section of another example of a color filter in accordance with the disclosure.

A partial cross section of another example is shown in FIG. 5. Many of the elements described above with reference to FIG. 2 are also applicable to or included in the touch-sensitive display of FIG. 5 and are not described again with reference to FIG. 5 to avoid obscuring the example described. In the example of FIG. 5, the sense electrodes 502 and the electrical conductors 504 are utilized as a shield when the source/drain electrodes are driven and the sense electrodes are not utilized to sense a touch. By utilizing the sense electrodes 502 and the electrical conductors 504 as the shield, the additional shield and insulator is not required. Thus, deposition and patterning of the additional shield and insulator is not carried out during manufacturing, resulting in reduced manufacturing costs. The thickness or height of the elements of FIG. 5 may also be reduced compared to the example shown in FIG. 2. As with the shield 212 in FIG. 2, the sense electrodes 502 and the conductors 504 shield the TFT structure from external electric fields, for example, from the environment, from electrical connections, or from other sources.

Figure 6:
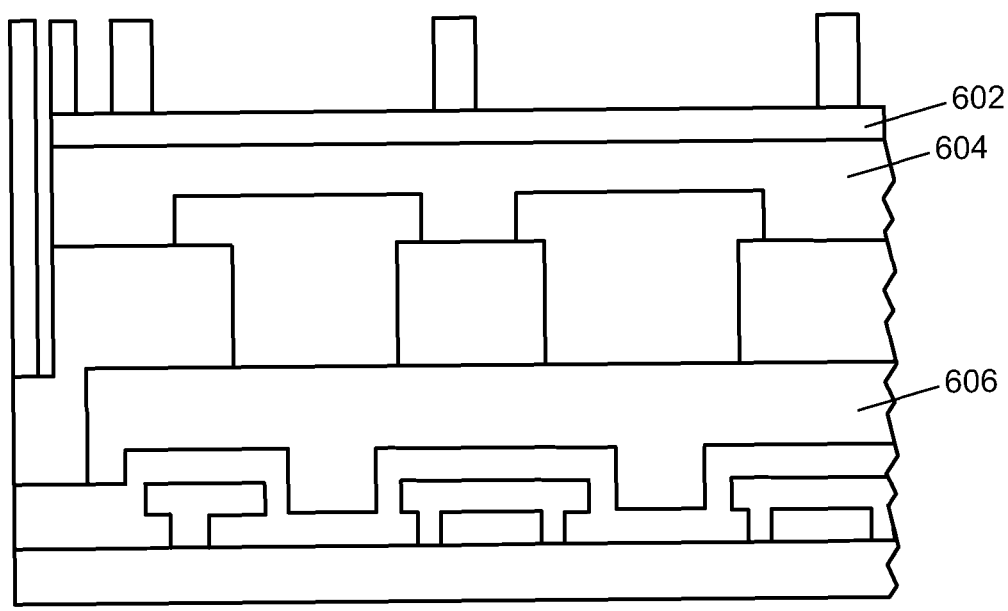
FIG. 6 is a partial cross section of another example of a color filter in accordance with the disclosure.

A partial cross section of another example is shown in FIG. 6. Many of the elements described above with reference to FIG. 2 are also applicable to or included in the touch-sensitive display of FIG. 6 and are not described again with reference to FIG. 6 to avoid obscuring the example described. A Vertical Alignment (VA) LCD material and TFT structure may be utilized in the display 112 of the touch-sensitive display 118. A common electrode 602 is disposed on the overcoat 604. A shield and additional insulator are not disposed on the insulator 606. Because the additional layer of insulator is not required, the thickness or height of the elements of FIG. 6 may be reduced compared to the example shown in FIG. 2. The common electrode 602 may be any suitable material, such as ITO.

The scanning electrodes and the sense electrodes may be deposited on the substrate. The scanning electrodes are disposed between the color filter and the substrate. An additional substrate for the scanning and sense electrodes is not required. The touch-sensitive display may be constructed with fewer layers, facilitating transmission of light and increasing display quality and clarity. Both the scanning electrodes and the sense electrodes are disposed near the outer surface of the touch sensitive display. The effect of a touch on the electric field is dependent on the distance to the scanning electrodes and the sense electrodes. A greater change in the electric field is detected when the scanning electrodes and the sense electrodes are closer to the surface on which the touch occurs and touches may be more accurately detected. The scanning and sense electrodes may also be electrically coupled to bond pads of the TFT structure, facilitating electrical coupling of the scanning and sense electrodes to the controller utilizing, for example, a flex connector. The same flex connector may optionally be utilized to electrically couple the pixel electrodes to a display controller.

An assembly includes a substrate, scanning electrodes and sense electrodes disposed on the substrate, and a color filter and black matrix disposed in an arrangement on the scanning electrodes and sense electrodes. The scanning electrodes and sense electrodes are disposed between the substrate and the arrangement. A touch-sensitive display includes a thin-film transistor structure and an assembly disposed on the thin-film transistor structure. The assembly includes a substrate, a color filter and black matrix disposed in an arrangement between the substrate and the thin-film transistor structure, and scanning electrodes and sense electrodes disposed between the substrate and the arrangement. An electronic device includes a thin film transistor structure and an assembly disposed on the thin-film transistor structure. The assembly includes a substrate, color filter and black matrix disposed in an arrangement between the substrate and the thin-film transistor structure, and scanning electrodes and sense electrodes disposed between the substrate and the arrangement. A controller is coupled to the scanning electrodes and the sense electrodes, and is configured to detect touches on the touch-sensitive display. An assembly includes a color filter and black matrix disposed on scanning electrodes and sense electrodes. The scanning electrodes and sense electrodes are disposed between the substrate and an arrangement comprising a color filter and black matrix.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. An assembly comprising:
    a substrate;
    scanning electrodes and sense electrodes disposed on a face of the substrate;
    color filter and conductive black matrix disposed in an arrangement on the scanning electrodes and sense electrodes, wherein the scanning electrodes and sense electrodes are disposed between the substrate and the arrangement;
    at least one insulator disposed between the scanning electrodes and the conductive black matrix and between the sense electrodes and the conductive black matrix;
    wherein the black matrix electrically couples the scanning electrodes to bond pads of a thin-film transistor display.

2. The assembly according to claim 1, wherein the scanning electrodes and the sense electrodes are disposed directly on the substrate.

3. The assembly according to claim 1, comprising electrical conductors coupling sense electrodes.

4. The assembly according to claim 1, wherein the scanning electrodes are aligned with the black matrix.

5. The assembly according to claim 1, comprising a shield disposed between the sense electrodes and the arrangement.

6. The assembly according to claim 1, wherein the scanning electrodes are separated from the sense electrodes by an electrode insulator.

7. A touch-sensitive display comprising:
    a thin-film transistor structure;
    an assembly disposed on the thin-film transistor structure, the assembly comprising:

a substrate;

color filter and conductive black matrix disposed in an arrangement between the substrate and the thin-film transistor structure;

scanning electrodes and sense electrodes disposed between the substrate and the arrangement;

at least one insulator disposed between the scanning electrodes and the conductive black matrix and between the sense electrodes and the black matrix, wherein the conductive black matrix electrically couples the scanning electrodes to bonding pads of the thin-film transistor structure.

8. The touch-sensitive display according to claim 7, wherein the scanning electrodes and the sense electrodes are disposed directly on the substrate.

9. The touch-sensitive display according to claim 7, comprising electrical conductors coupling sense electrodes.

10. The touch-sensitive display according to claim 7, wherein the scanning electrodes are aligned with the black matrix.

11. The touch-sensitive display according to claim 7, comprising a shield disposed between the sense electrodes and the arrangement.

12. An electronic device comprising:

a thin film transistor structure;

an assembly disposed on the thin-film transistor structure, the assembly comprising:

a substrate;

color filter and conductive black matrix disposed in an arrangement between the substrate and the thin-film transistor structure;

scanning electrodes and sense electrodes disposed between the substrate and the arrangement;

at least one insulator disposed between the scanning electrodes and the conductive black matrix and between the sense electrodes and the black matrix, wherein the conductive black matrix electrically couples the scanning electrodes to bonding pads of the thin-film transistor structure; and a controller coupled to the scanning electrodes and the sense electrodes, and configured to detect touches on the touch-sensitive display.

13. The electronic device according to claim 12, wherein the controller is configured to detect the touches during horizontal blanking periods of the thin-film transistor structure.

* * * * *